Patented Dec. 19, 1939

2,184,246

UNITED STATES PATENT OFFICE 2,184,246

METHOD OF PREPARING VEGETABLES

Donald T. Wiltse, Great Neck, N. Y.

No Drawing. Application February 8, 1935,
Serial No. 5,587

2 Claims. (Cl. 99—186)

This invention concerns the processing of vegetables, including comminution to render them suitable for consumption by invalids and babies, hermetically sealing in containers, and sterilizing. Methods have heretofore been employed, following these lines, but with all of them the finished product exhibits objectionable features. Thus, and perhaps most importantly, the natural color of the vegetable is not retained; flavor is partly lost; aroma is not appealing; there is a loss in visual attractiveness, apart from color; there is a loss of mineral salts and perhaps other nutritional values; and vegetable fiber (desirable for its effect in the intestinal tract) is not found in the desirable condition or proportion.

Known methods follow substantially the same lines, the steps being generally as follows: Vegetables, e. g., spinach, carrots, peas, string beans, kale, asparagus, beets, etc. etc., are washed and culled and then boiled or cooked to soften them, so that they may be reduced to a slime or sludge state, as by beating or forcing them, so softened, through sieves. The mass is then placed while hot in containers, which are hermetically sealed and then subjected to sterilization. The cooking takes place under vacuum, or steam pressure, so that vitamin C may be held in the vegetable, since this vitamin is not thermostable when the vegetable is cooked in the presence of air. The cooking also serves to remove certain substances or essences, including sulphur compounds, which give to some vegetables a disagreeable taste in the raw state.

Under the known methods the coloring pigments of the vegetables are effected chemically, so that discoloration occurs, and flavor esters and aroma are impaired. It is recognized that discoloration greatly lessens the attractiveness of the food, or in other words, greatly impairs the consumer's acceptance thereof. The cooking of vegetables in added water at the boiling temperatures in the practices commonly employed prior to my invention, serves to turn the chlorophyll into phaeophytin, which is brownish, and diminishes the brightness of erythrophyll or other red coloring matter and of carotin, all to the detriment of the product. It is believed that these undesirable results are largely due to chemical reactions which take place when vegetables are heated to or near the boiling point, particularly in the presence of air. Additionally, the constituents responsible for characteristic flavor and aroma seem to be as it were tied up with the pigments, or at least subject to destruction or loss by the same agencies or treatments that affect the pigments and so are harmfully affected by the cooking or boiling. Furthermore, with these known methods the resulting product is a slimy mass, not visually attractive, minus mineral salts, sugars and other values of the original vegetable, and with a deficiency in the content of recognizable fibrous particles necessary to give the product the "bulk" that is so desirable for the purposes of intestinal functions.

An object of the present invention is to provide new, simple, and effective methods for making vegetables into baby and invalid foods under such controls that the color, flavor, aroma and other qualities of the vegetable are not substantially impaired, may even in some cases be improved, and are retained for a long period, while at the same time the proportion of liquid to total mass, and the condition and proportion of fibrous material are optimum. Color conservation is perhaps most important, in view of the fact that the characteristic form of the original vegetable is destroyed by comminution, so that color, flavor and aroma must be largely relied on to identify the product to the eventual consumer when he comes to purchase. And I believe that, as compared with "baby food" vegetables heretofore produced, I have made up to a great extent for the loss of attractiveness resulting from the amorphous condition of the product, by increasing its attractiveness in the matters of color, flavor and aroma, and in the matter of appearance generally (that is, apart from color).

In the practice of my method the first step is to wash and clean the fresh vegetables, e. g. spinach, to remove all foreign matter, this step followed by culling. Extraneous moisture is then drained from the culled vegetables, so that prior to further processing the vegetables are in substantially their natural form, free from added water. The substantially water-free vegetables are now subjected without any added water, and in the cold, or at least without subjecting them at any time to any temperature that approaches boiling or cooking temperature, or that would injuriously effect color, etc., to a treatment for reducing them to comminute form. This result can be obtained by pounding, grinding, rolling, and mashing, or chopping or mincing, until the required fineness is attained, and substantially all air occluded in the cellular or inter-cellular structure is liberated, so that it may be readily driven off in the succeeding step. The comminution also liberates a quantity of the natural juices of the vegetables, so that a more or less pulpy mass is produced. None of the fiber or other content of the mass is removed during the comminuting operation or thereafter, and the mass is now put into heated vats and agitated, until substantially all of the aforesaid occluded air, as well as the air which has been whipped into the mass in the comminuting operation, is removed and certain undesirable volatiles, including hydrogen sulphide, are released and driven off. In these vats the temperature is held below the point at which undesirable oxidation is encouraged and at which decomposition of coloring matter begins. In practice it has been found that temperatures of about 150° F. to 170° F. (say 160° F.) will suffice; and I have observed that as the preliminary heating and agitation proceeds, there is sometimes an apparent heightening of color, perhaps resulting from decreasing opacity of certain constituents of the vegetable, and perhaps an intensification of flavor and aroma that may be attributable to slight concentration. This step of releasing and driving off air and undesirable volatiles requires continuation for different lengths of time dependent upon the vegetables being treated. For example, in practice it has been found that admirable results are attained by treating spinach for two hours at 160° F.; carrots for 25 minutes; and peas for 25 minutes, all at the same temperatures. Any variations for particular vegetables will be easily empirically determined.

As the next step, the mass from which air and undesirable volatiles have been removed, is immediately filled in the hot state into containers which are immediately hermetically sealed. As before stated, the comminution step liberates a quantity of the natural juices of the vegetable, and these juices aid in completely filling the container and surrounding and barely covering the mass of vegetable proper. If there is not in any particular case sufficient of the juice, I may add the natural juice obtained by straining the juice from another mass of comminuted vegetable that may have been similarly treated, that is to say, washed, drained, culled, comminuted, preliminarily heated to 160° F., and agitated. In any case the proportion of liquid in the mass is preferably such that there is the minimum dispersion of pigment and other matter; so that, as compared with previously known products, there is an effect of color concentration and heightening. As a final step, the sealed containers are subjected to the proper degree of heat under steam pressure in retorts, to insure destruction of the chief causes of food poisoning, e. g., *Bacillus aertrycke*, enteritidis and botulinus. The product resulting from the foregoing steps possesses the natural colors of the particular fresh uncooked vegetable, has good consistency and fiber content, and is not slimy in appearance. It also has the flavor and aroma found in the fresh vegetable as when cooked in the usual way in plain water without other addition; as well as substantially all the mineral salts, sugars and other values of the fresh uncooked vegetable. It is believed that some of the gratifying results of the method are due to the absence of any such cooking of the vegetable as would result in the oxidation or other chemical reaction which causes decomposition of the vegetable coloring matter; and to the retention of those constituents that beneficially affect the flavor and aroma of the vegetables, which constituents are in large measure detrimentally affected or lost where boiling and the temperatures incidental thereto are employed, and where part of the mass is separated out and discarded. Moreover, since, according to my process, substantially all of the air and undesirable volatiles are driven from the mass during the preliminary agitation in heated vats, oxidation will not occur in the sealed containers when and after these are subjected to the sterilizing temperatures. The liberated juices of the vegetable which entirely surround the fine particles thereof, effectively prevent the intrusion of extraneous air into the pulpy mass once the step of air removal has been carried out. And it is believed that these natural juices constitute a benign medium from the standpoint of conserving coloring matter, etc. of the vegetable than would any medium which included added water. The advantages of true comminution, as distinguished from a sliming operation, have already been referred to.

The products resulting from the methods set forth hereinbefore as previously stated, comprise comminute vegetables that exhibit and retain during prolonged storage their natural color, agreeable flavor and aroma, and other desirable characteristics. Certain vegetables are ready for human consumption immediately after they are removed from their containers, but, of course, other vegetables will require cooking in the usual way. The vital factor to be considered is that the usual cooking immediately preceding consumption has the ordinary effect, that is, such cooking produces the same results on vegetables preserved by my process as is produced upon fresh vegetables. Thus it may be said that my method serves to make possible the supplying to consumers of vegetables that are in effect fresh, at any time.

It is to be understood that while I speak of comminuting in the cold, I have in mind merely that in the comminuting operation (and this applies also to every other step of the process except the final sterilizing operation) all temperatures that would result in impairing color, etc. are avoided.

I claim:

1. The method of preparing and preserving chlorophyll-, carotin-, or erythrophyll-colored vegetables which comprises comminuting the vegetables in substantially fresh clean condition and substantially free of extraneous water, subjecting the comminute mass to a temperature of about 160° F. and to agitation to drive off air and undesirable volatiles from the mass, hermetically sealing the mass as so treated and free from air and volatiles in containers and subjecting the containers and their contents to sterilizing temperatures, substantially as set forth.

2. The method of preparing and preserving vegetables which comprises comminuting in the cold chlorophyll-, carotin-, or erythrophyll-colored vegetables in substantially fresh clean condition and substantially free of extraneous water, subjecting the comminute mass to a temperature of about 160° F. and to agitation to drive off air and undesirable volatiles from the mass, hermetically sealing the mass as so treated and free from air and volatiles in containers and subjecting the containers and their contents to sterilizing temperatures, substantially as set forth.

DONALD T. WILTSE.